J. H. WAGENHORST.
VEHICLE WHEEL RIM.
APPLICATION FILED FEB. 10, 1912.
1,136,985.
Patented Apr. 27, 1915.
3 SHEETS—SHEET 1.
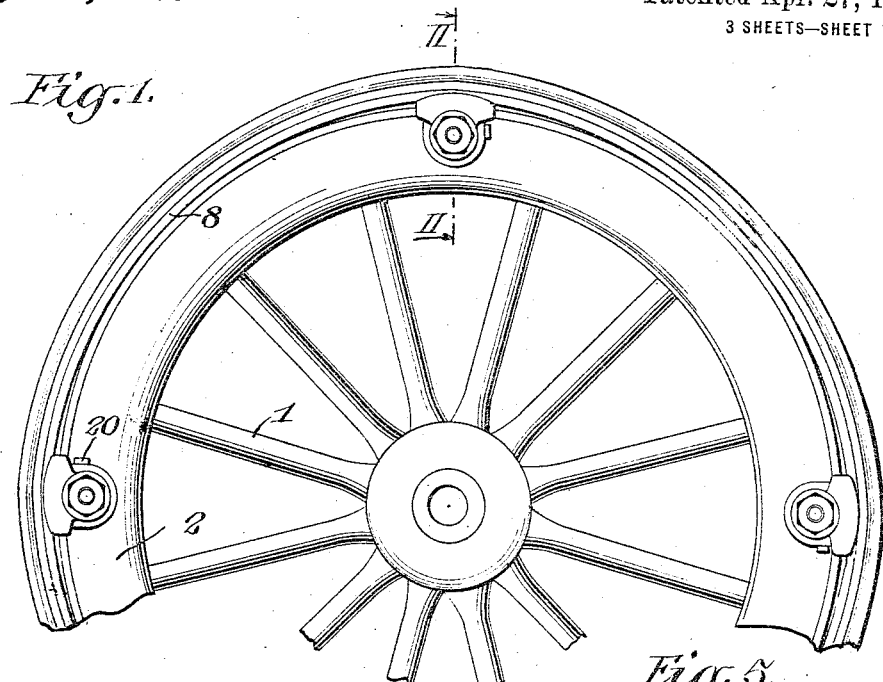
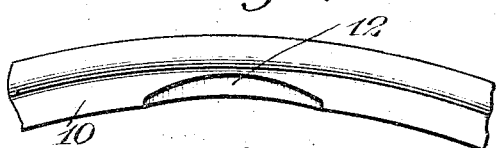
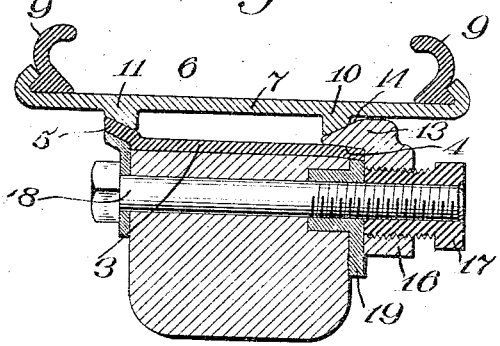
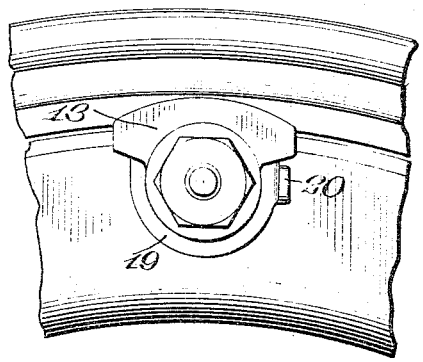
WITNESSES
James H. Wagenhorst
INVENTOR
BY Seward Davis
ATTORNEY J. H. WAGENHORST.
VEHICLE WHEEL RIM.
APPLICATION FILED FEB. 10, 1912.
1,136,985.
Patented Apr. 27, 1915.
3 SHEETS—SHEET 2.
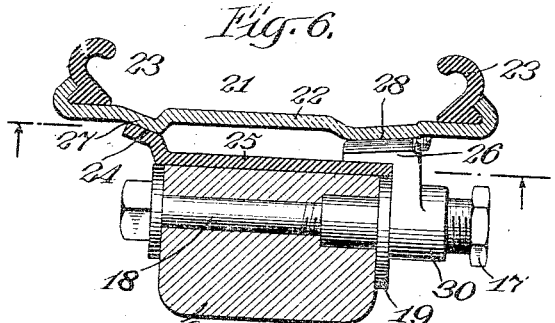
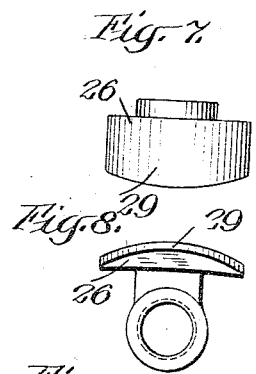
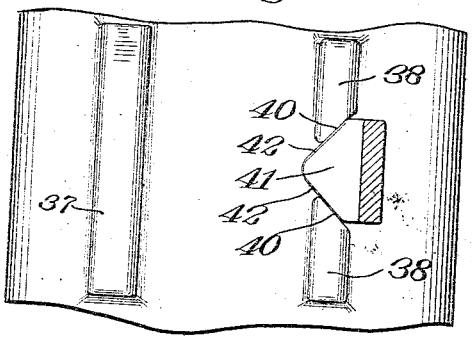
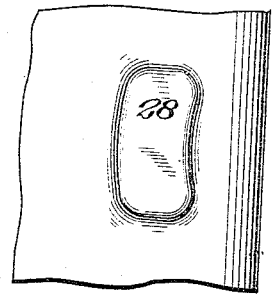
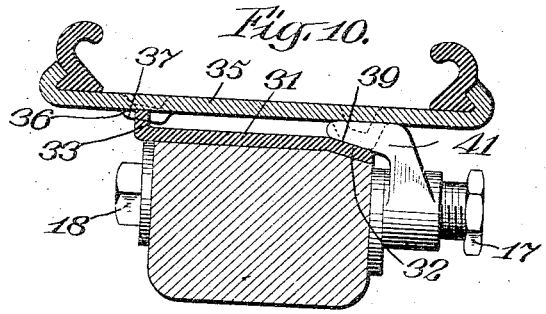
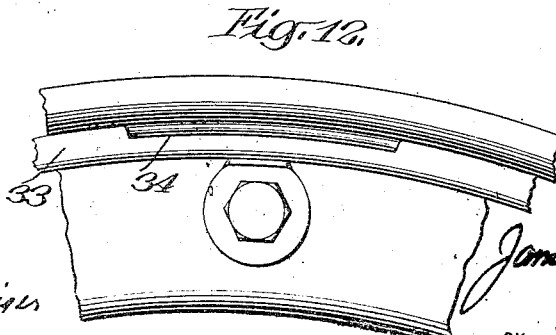
WITNESSES
Gerald E. Terwilliger
Edmund Quincy Moses
James H. Wagenhorst
INVENTOR
BY Seward Davis
ATTORNEY J. H. WAGENHORST.
VEHICLE WHEEL RIM.
APPLICATION FILED FEB. 10, 1912.
1,136,985.
Patented Apr. 27, 1915.
3 SHEETS—SHEET 3.
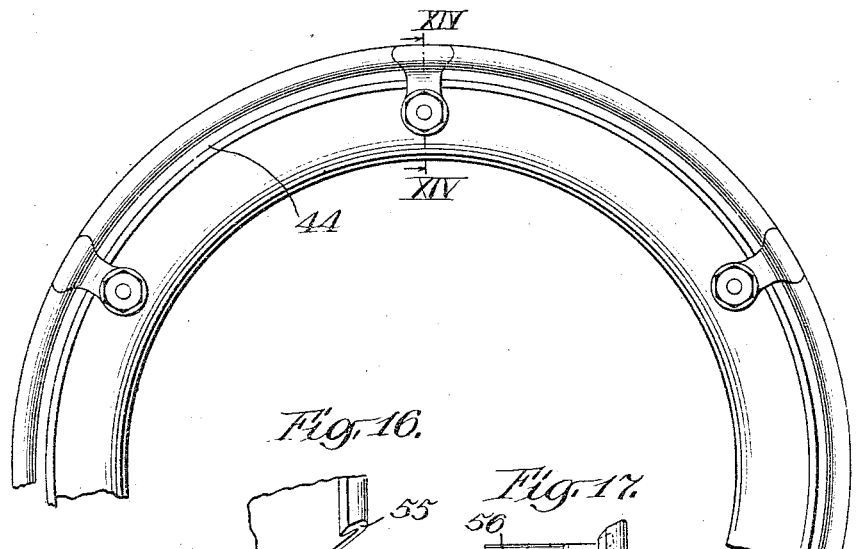
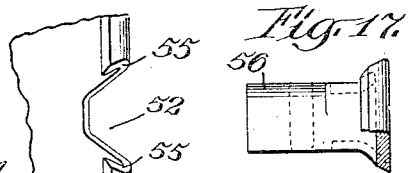
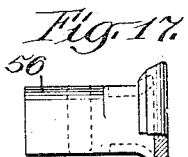
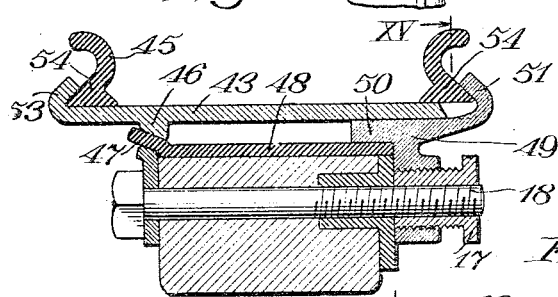
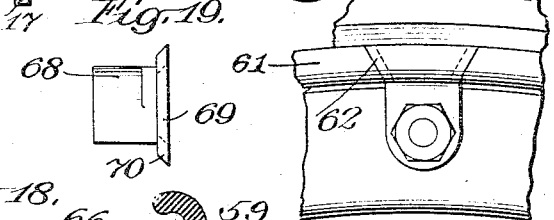
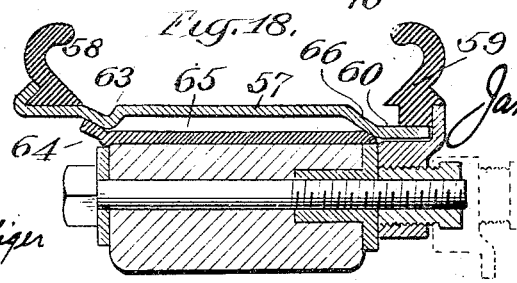
WITNESSES
G. E. Terwilliger
Edmund Quincy Moses
James H. Wagenhorst
INVENTOR
BY Seward Davis
ATTORNEY

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE WHEEL-RIM.

1,136,985.      Specification of Letters Patent.      Patented Apr. 27, 1915.

Application filed February 10, 1912. Serial No. 676,820.

*To all whom it may concern:*

Be it known that I, JAMES H. WAGENHORST, a citizen of the United States, residing in the city of Akron, county of Summit, and State of Ohio, have invented certain new and useful Improvements in Vehicle Wheel-Rims, of which the following is a specification.

This invention relates to improvements in vehicle wheel rims designed to carry pneumatic or other resilient tires, and particularly to that class of rims known as demountable, in which the tire-carrying rim carrying the resilient tire is removably secured upon the wheel, so that the rim and tire may be removed and replaced as a unit.

My present invention comprises improved and simplified means for securing the tire-carrying rim upon the wheel, the securing means being preferably so constructed as to lock the tire-carrying rim against circumferential creeping as well as to prevent the lateral displacement of the rim.

In the accompanying drawings which form a part of this specification, Figure 1 is a side elevation of a portion of a vehicle wheel having a rim embodying one form of my invention applied thereto; Fig. 2 is a transverse section on the line II—II of Fig. 1; Fig. 3 is a view similar to Fig. 2 showing the locking wedge turned to inoperative position; Fig. 4 is a side elevation of the parts shown in Fig. 2; Fig. 5 is a side elevation of a portion of the rim base showing one of the recesses in the flange thereof formed for the reception of one of the locking wedges; Fig. 6 is a transverse section through a wheel felly, felly band and rim embodying another modification of my invention, one of the locking wedges for securing the rim upon the felly band being shown in elevation; Fig. 7 is a plan view, and Fig. 8 is an elevation looking from the inside of the locking wedge shown in Fig. 6; Fig. 9 is a view of the under-side of the rim base shown in Fig. 6, showing one of the seats for the locking wedges; Fig. 10 is a transverse section through the felly, felly band and rim showing another modification of my invention, one of the locking devices being shown in side elevation; Fig. 11 is a view of the under-side of the tire-carrying rim shown in Fig. 10, a portion of the locking wedge being shown in engagement with the supporting and driving lugs of the rim base; Fig. 12 is a side elevation of the back or inside of a portion of the rim and wheel felly shown in Fig. 10; Fig. 13 is a side elevation of a wheel felly having a rim applied thereto embodying a modified form of my invention; Fig. 14 is a transverse section on the line XIV—XIV of Fig. 13; Fig. 15 is a section on line XV—XV of Fig. 14, the endless tire-retaining flange being omitted; Fig. 16 is a plan view of a portion of the rim base showing one of the notches for the reception of one of the wedges or locking devices; Fig. 17 is a plan view of one of the wedges or locking devices, a portion of the hook being broken away; Fig. 18 is a transverse section through a wheel felly, felly band and tire-carrying rim embodying another modified form of my invention. In this figure the locking device is shown in full lines in operative position, and in dotted lines in inoperative position; Fig. 19 is a plan view of the locking device shown in Fig. 18; Fig. 20 is a side elevation of a portion of the felly and rim shown in Fig. 18, the locking device being illustrated in operative position.

Referring to the drawings in detail, and particularly to Figs. 1 to 5, inclusive, the numeral 1 designates a vehicle wheel having a felly 2, to which is permanently secured, by shrinking or otherwise, a felly band 3. The felly band 3 is provided at one edge with an annular seat or bearing surface 4 preferably somewhat beveled, and at the other edge with a raised annular seat 5 beveled in the same direction as the seat 4.

6 is the tire-carrying rim comprising the rim base 7, which in the form of my invention illustrated is transversely split at the point 8, and the endless tire-retaining flanges 9. The rim base 7 is provided with inwardly projecting flanges 10 and 11, the flange 10 being deeper than the flange 11 and having a bearing surface formed upon it engaging the bearing surface 4, while the face of the flange 11 is beveled to engage the beveled bearing surface 5 on the felly band. The flange 10 is cut out at intervals to form recesses 12, which are concave and inclined in the opposite direction to the bearing surfaces 4 and 5.

The tire-carrying rim is locked upon the felly band by means of a plurality of wedges 13, the upper active surfaces 14 of which are practically cone-shaped and fit the recesses 12 formed in the flange 10 of the rim base. The surfaces 15 preferably fit the bearing surface 4 of the felly band. The wedges may be bolted to the wheel felly in any suitable manner, but I prefer to form the body portions 16 of the wedges with internally threaded openings therethrough, the wedges being then screwed upon externally and internally threaded nuts or sleeves 17, which screw upon the projecting ends of bolts 18. The bolts 18 pass transversely through the felly and screw through washers 19, these washers 19 acting as nuts to secure the bolts permanently in position and also being themselves secured by the bolts against the face of the felly. The threads on the ends of the bolts 18 and the external threads on the nuts 17 are of opposite pitch, so that the rotation of the nuts 17 acts to move the wedges, if the latter are held against rotation, toward or from the felly, a distance equal to the combined pitch of the threads on the bolts and on the nuts for each revolution of the nuts. Supposing the wedges to be moved into operative position, as shown in Fig. 2, the rotation of the nuts 17 will first withdraw the wedges away from the felly band, the wedges being prevented from rotation owing to the engagement of their surfaces 15 with the surface 4 of the felly band. When the points of the wedges 13 have cleared the edge of the felly band, the wedges will be carried around with the nuts 17 until they are in inverted position, as shown in Fig. 3, in which position they will be stopped from further rotation by means of the lugs 20 projecting from the washers 19. The engagement of the body portions 16 of the wedges with the heads of the nuts 17 will then prevent further rotation of the nuts 17, so that the nuts and wedges cannot be accidentally detached from the bolts 18. The convex shape of the wedges, which causes them to fit the recesses 12, permits them to rotate beneath the edge of the rim base and thus to be turned to the inoperative position shown in Fig. 3. If they were not rounded in this manner, they would have to be made very short in order to prevent their corners from striking the under-side of the rim and preventing their rotation. These wedges operate to force the tire-carrying rim laterally upon the felly band, and thus cause the flange 11 to wedge upon the bearing surface 5 at the inside of the wheel periphery. The wedges also lift the flange 10 away from its seat upon the felly band at intervals, and thus cause the portions of the flange between the wedges to be drawn down and to clamp the felly band tightly between the wedges, as shown in Fig. 1. The rim will thus grip the felly band very firmly and but a small number of wedges need be used; for example, four. The wedges fitting the concave recesses 12 in the flange 10 also serve positively to prevent the creeping or circumferential movement of the rim upon the felly band, and thus act as driving plates for the rim. This manner of driving the rim is superior to the use of driving plates fixed to the rim and felly band in the ordinary manner, as with such fixed driving plates some play must be left to permit the rim to be moved into or out of position upon the wheel, and consequently a slight movement will always be permitted between the rim and the felly band. Such movement is exceedingly objectionable, as the rim will be worked back and forth in a circumferential direction upon the felly band every time that the vehicle is started or stopped, and this working back and forth will inevitably result in a short time in serious wear of the parts. By using my wedges for the purpose of driving the rim, however, I succeed in rendering the rim absolutely immovable upon the felly band, as the wedges may be forced tightly into the recesses 12, which they are shaped to fit. In addition to thus securing immovability of the rim, I also eliminate the necessity of attaching driving plates to the rim and felly and thus decrease the cost of manufacturing the structure.

In Figs. 6, 7, 8 and 9, I have shown a modification of my invention in which the tire-carrying rim 21 comprises a transversely split rim base 22 and the endless flanges 23, the rim base being supported at one side upon the raised bearing surface 24 of the felly band 25, the other side of the rim base being supported wholly upon the wedges 26, of which any suitable number may be used, for example, usually 8 or 10 for automobile wheels of ordinary diameters. The rim base 22 has formed in it a rib 27, which seats upon the bearing surface 24 of the felly band, the rim being provided near its other side with a series of depressed seats 28 adapted to be engaged by the wedges. The rib 27 and seats 28 are preferably formed by indenting the metal of the rim base without thickening the same, so that the rim base may be stamped cold from a sheet metal blank. The seats 28 are preferably inclined toward the inside or back of the wheel, as shown, and are also preferably curved in a circumferential direction to a radius shorter than that of the radius of the under-side of the rim, and they are also preferably concave to the outer edge of the rim, as shown in Fig. 9. The curvature of the seats 28 is thus generally similar to the curvature of the seats 12 of the rim shown in Figs. 1 to 5. The wedges 26 have upper substantially conical faces 29 which engage and fit the surfaces 28. The body portions 30 of the wedges screw upon nuts 17 which in turn screw upon the threaded ends of bolts 18 passing through the felly 2, the construction and operation of these bolts and nuts being the same as has been described in connection with the form of my invention shown in Figs. 1 to 5, inclusive. It will be seen that the wedges 26 engaging the concave surfaces 28 will force the rim laterally upon the felly band, and thus cause the rib 27 to seat firmly upon the beveled surface 24. The wedges 26 will directly support the other side of the rim from the felly band, a sufficient number of wedges being used to give the rim adequate support to prevent the undue distortion of the same. Owing to the lateral and circumferential curvature of the surfaces 28 and to the corresponding curvature of the wedge surfaces, the wedges will lock the rim against circumferential movement or creeping with relation to the wheel.

In Figs. 10, 11 and 12 I have shown another modification of my invention, in which the felly band 31 has at one edge a downwardly beveled annular bearing surface 32, and at the other edge an upturned flange 33 notched at intervals, as indicated at 34. The rim base 35 of the tire-carrying rim has formed on its under-surface a plurality of projections or rib sections 36 corresponding in length and location to the notches 34 formed in the flange 33 of the felly band. These projections are preferably stamped in the rim base without thickening the metal thereof, and their under-surfaces 37 are slightly beveled so as to constitute inclined bearing surfaces adapted to engage with the bottoms of the notches 34 in the flange 33 of the felly band. Near the other side the rim base has stamped from it a plurality of projections 38, these projections having beveled lower surfaces 39 adapted to engage the beveled seat 32 on the felly band. The projections 38 are arranged in pairs, the adjacent ends 40 of each pair being inclined toward each other, as shown in Fig. 11. In order to secure the rim upon the wheel, a plurality of wedges 41 are used, these wedges having lower surfaces adapted to fit the beveled bearing surface 32 of the felly band and upper surfaces adapted to slide beneath the under-surface of the rim base 35. The side walls 42 of the wedges converge and are adapted to fit the space between two of the adjacent projections 38. The wedges may be secured to the wheel felly in any suitable way, as by being mounted upon nuts 17 carried by bolts 18 of the construction already described. The screwing in of the wedges 41 causes their inclined faces 42 to engage the inclined ends 40 of the lugs 38, and thus force the rim laterally upon the felly band, causing the inclined faces 37 of the projections 36 and the inclined faces 39 of the projections 38 to wedge upon the corresponding bearing surfaces at the sides of the felly band. The engagement of the wedges with the projections 38 also serves to lock the rim against creeping or circumferential movement relative to the wheel. The projections 36 entering the notches 34 in the flange 33 also serve to prevent creeping of the rim. It will be understood that while both of these means to prevent creeping may be used, both are not essential, and the wedges engaging the lugs 38 alone may be relied upon, and also that the projections 36 and notches 34 may be used with other forms of wedges not adapted to prevent creeping movement, for example, with the wedges now commonly in use, which are inserted between a plain felly band and an ordinary clencher rim.

Referring now to Figs. 13 to 17, inclusive, I have shown in these figures another modification of my invention in which the rim base 43, transversely split at 44 and carrying the endless tire-retaining flanges 45, is provided near one side with the inwardly projecting rib 46 having a beveled face adapted to seat upon the raised beveled bearing surface 47 carried by the felly band 48. The other side of the rim base is supported by a plurality of wedges or locking members 49, portions of which, 50, enter between the felly band and the under-surface of the rim base. The locking members 49 also have hooked flanges 51 which fit in notches 52 formed in the edge of the rim base. The rim base is preferably provided with inwardly hooked side flanges 53 which engage the wedge-shaped base portions 54 of the endless tire-retaining flanges 45, and where one of these flanges 53 is cut away to form a notch 52, the hooked flange 51 of the corresponding member 49 will engage the base 54 of the flange 45 at that point and draw the same and the rim base toward the felly band. The end walls 55 of the notch 52 are also beveled, so that when engaged by the correspondingly beveled ends of the hooked portions 51 of the locking members 49, the locking members will exert a wedging action upon the rim base, and thus serve to draw the rim base toward the center of the wheel until it seats solidly upon the portions 50 of the locking members. The locking members 49 may be secured to the wheel felly in any suitable manner, for example, they may screw upon the externally and internally threaded nuts 17 which are carried by the bolts 18 of the construction already described. When the locking members 49 are screwed up they force the rim laterally upon the felly band and thus cause the beveled face of the rib 46 to wedge upon the beveled bearing surface 47. The locking members also draw the rim firmly down upon the portions 50 and also lock the rim against circumferential movement upon the wheel. The locking members thus serve positively to lock or anchor the rim to the wheel at a plurality of spaced points, securing the rim against lateral, circumferential and radially outward movement. They also enable the rim to support any load to which it may be subjected between adjacent locking devices, as such locking devices act as abutments to an arch of which the loaded portion of the rim is the span, this arch action of the rim preventing it from being distorted. The portions 50 of the locking members are preferably rounded off at one corner, as indicated at 56, in order to permit the locking members to be rotated to inoperative position when withdrawn sufficiently for the extremities of the portions 50 to clear the edge of the felly band.

In Figs. 18, 19 and 20 I have illustrated another modification of my invention in which the tire-carrying rim comprises an endless rim base 57 having one endless tire-retaining flange 58 and one transversely split tire-retaining flange 59, the ends of which may be secured together in any suitable manner, as by means of the locking device shown in the patent to Bryant, No. 912,537 of February 16, 1909. The split flange 59 seats in a channel 60 formed at one side of the rim base, the outer wall 61 of the channel being notched at a plurality of points, as indicated at 62 in Fig. 20, the walls of the notches diverging upward and outward, as shown in that figure. The rim base is also provided with a rib 63 having a beveled surface which seats upon a beveled bearing surface 64 formed at one edge of the felly band 65. The inner wall 66 of the channel 60 is inclined and its outer surface forms a beveled bearing surface which engages with the beveled bearing surface 67 formed at the edge of the felly band. For securing the rim to the felly band, I use a plurality of locking members 68, suitable means being provided for bolting these members to the wheel felly. For example, plain bolts and nuts may be used for this purpose, or the body portions of the locking members may have internally threaded openings therethrough and may screw upon internally and externally threaded nuts 17 carried by bolts 18 of the form already described. The members 68 have flanges 69 which fit the notches 62 in the flanges 61 of the rim base, the end walls 70 of the flanges 69 being beveled to correspond with the end walls of the notches 62. When the locking members 68 are forced laterally, the flanges 69 enter the notches 62 and force the rim laterally upon the felly band so as to bring the beveled faces on the rim in engagement with the beveled bearing surfaces on the felly band, the beveled walls 70 at the same time engaging the beveled walls of the notches and exerting a wedging action on the latter so as to draw or clamp the rim down upon the felly band. The locking members 68 also serve positively to lock the rim against circumferential or creeping movement upon the felly. To remove the rim, the nuts 17 are rotated to withdraw the locking members 68 until the latter are free to rotate, when they will turn into the inverted position, as shown in dotted lines in Fig. 18.

Having thus described certain preferred embodiments of my invention, but without desiring to limit myself to the details thereof any further than as specified in some of the more specific claims hereunto appended.

I claim:

1. In a vehicle wheel, in combination, a fixed rim having bearings surfaces of different diameters near the edges thereof, a tire-carrying rim having bearing surfaces of different diameters adapted to engage the bearing surfaces of the fixed rim, the bearing surface of smaller diameter being formed upon an inwardly projecting portion of said rim, said inwardly projecting portion being recessed, and a wedge carried by the wheel and adapted to be forced laterally into said recess and between the fixed rim and tire-carrying rim.

2. In a vehicle wheel, in combination, a felly, a felly band thereon having a raised beveled bearing surface at one edge thereof, a tire-carrying rim mounted upon said felly band and having near one side thereof a beveled bearing surface engaging the beveled bearing surface of said felly band, and having near the other side thereof a plurality of concave beveled seats and a plurality of locking wedges secured to the felly and movable laterally with relation thereto, said wedges having convex beveled bearing surfaces adapted to engage and interlock with the concave beveled bearing surfaces of the rim, whereby said wedges will hold said rim upon said felly band against lateral and circumferential movement.

3. In a vehicle wheel, rim, in combination, a felly, a felly band thereon having a raised beveled bearing surface at one edge thereof, a tire-carrying rim mounted on said felly band and having inwardly projecting ribs near each side thereof, one of said ribs having a beveled bearing surface engaging the raised beveled bearing surface on said felly band, and the other rib extending into contact with the other side of said felly band, said second rib being cut out at intervals to form beveled concave bearing surfaces, bolts passing transversely through said felly and locking wedges carried by said bolts, said locking wedges have surfaces supported upon said felly band and having beveled convex wedging surfaces engaging the concave bearing surfaces of said rim.

4. In a vehicle wheel, in combination, a felly, a felly band thereon having a raised beveled bearing surface at one edge thereof, and a beveled bearing surface of smaller diameter at the other edge thereof, a tire-carrying rim mounted upon said felly band and having inwardly projecting ribs near each side thereof, one of said ribs having a beveled bearing surface engaging the raised beveled bearing surface of said felly band, and the second rib being of greater depth than said first rib and having a beveled bearing surface engaging the second beveled bearing surface of said felly band, said rib having recesses formed therein at intervals, the walls of said recesses being concave and beveled in a direction opposite to the bevel of the main bearing surface of said rim, bolts projecting laterally from the side of said felly, and wedges carried by said bolts, said wedges having surfaces engaging the surface of said felly band and having convex wedging surfaces engaging the concave bearing surfaces of the flange of said tire-carrying rim, said wedges, when withdrawn from engagement with the concave bearing surfaces of said rim, being rotatable about said bolts to inoperative position.

5. In combination with a vehicle wheel having a bearing surface on its periphery, a tire-carrying rim, and means for distorting said rim to cause the same to grip the bearing surface of said wheel at intervals, said means comprising bolts projecting laterally from the wheel felly, and wedges mounted on said bolts, said wedges entering between the wheel periphery and the rim at separated points and lifting the rim out of contact with the bearing surface of the wheel adjacent to said points.

6. In a vehicle wheel, in combination, a fixed rim having a raised bearing surface at one edge thereof, a tire-carrying rim having a bearing surface near one side thereof engaging the raised bearing surface on said fixed rim, said tire-carrying rim having near the other side thereof a second bearing surface adapted to engage a bearing surface formed at the other side of said fixed rim of less diameter than said raised bearing surface, and laterally movable wedges carried by the wheel adapted to be inserted between said fixed rim and said tire-carrying rim at intervals about the circumference of the wheel, said wedges lifting the second bearing surface of said tire-carrying rim out of contact with its complementary bearing surface on the fixed rim at intervals, and drawing said bearing surfaces into contact between adjacent wedges.

7. In a vehicle wheel, in combination, a fixed rim having a raised beveled bearing surface at one edge thereof, and having a second bearing surface at the other edge thereof of less diameter than said beveled bearing surface, a tire-carrying rim having a bearing surface near one side thereof engaging the raised beveled bearing surface on said fixed rim, said tire-carrying rim having near the other side thereof an inwardly projecting portion having a second bearing surface thereon adapted to engage the bearing surface of said fixed rim of smaller diameter, said projecting portion having recesses formed therein at intervals, and laterally movable wedges carried by the wheel adapted to be inserted in said recesses and to be wedged between the walls thereof and the bearing surface of smaller diameter of said fixed rim, said wedges lifting the second bearing surface of said tire-carrying rim out of contact with its complementary bearing surface on the fixed rim at intervals and drawing said bearing surfaces into contact between adjacent wedges, said wedges also locking said tire-carrying rim against circumferential movement on the fixed rim.

JAMES H. WAGENHORST.

Witnesses:
B. T. HADLEY,
H. O. WOLF.